United States Patent [19]

Kondo

[11] 4,206,441
[45] Jun. 3, 1980

[54] IDENTIFICATION APPARATUS

[75] Inventor: Takashi Kondo, Kawasaki, Japan

[73] Assignee: Tokyo Shibaura Denki Kabushiki Kaisha, Kawasaki, Japan

[21] Appl. No.: 972,384

[22] Filed: Dec. 22, 1978

[30] Foreign Application Priority Data

Dec. 23, 1977 [JP] Japan .............................. 52-154532

[51] Int. Cl.² .............................................. G06K 9/00
[52] U.S. Cl. .................... 340/146.3 E; 340/146.3 AE
[58] Field of Search ............. 340/146.3 E, 146.3 AC, 340/146.3 AE, 149 R, 149 A

[56] References Cited

U.S. PATENT DOCUMENTS

| | | | |
|---|---|---|---|
| 3,576,537 | 4/1971 | Ernst | 340/146.3 E |
| 3,576,538 | 4/1971 | Miller | 340/146.3 E |
| 3,581,282 | 5/1971 | Altman | 340/146.3 E |
| 3,636,513 | 1/1972 | Tisdale | 340/146.3 AC |
| 3,648,240 | 3/1972 | Jacoby et al. | 340/146.3 E |
| 3,766,520 | 10/1973 | Patterson | 340/146.3 AE |
| 4,032,889 | 6/1977 | Nassimbene | 340/146.3 E |
| 4,083,035 | 4/1978 | Riganati et al. | 340/146.3 E |

*Primary Examiner*—Leo H. Boudreau
*Attorney, Agent, or Firm*—Oblon, Fisher, Spivak, McClelland & Maier

[57] ABSTRACT

A palm pattern detector detects a palm pattern and produces an analog signal corresponding to the palm pattern. The analog signal is converted into a palm bit pattern corresponding to a palm pattern comprised of a number of bit data. Bit data corresponding to the contour of a palm from the palm bit pattern is read out and a contour bit pattern is formed. A displacement between adjacent bit data of the contour bit pattern is detected and is coded into slope code information. A slope change between adjacent line components of the palm contour is detected from adjacent slope code information to obtain a curvature code information. The curvature code information representing a concave part of the palm contour is removed from the curvature code information and the curvature code information reperesenting the convex part is used as a personal feature parameter in the personal identification.

10 Claims, 17 Drawing Figures

| INPUT | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| OUTPUT | 1 | 2 | 3 | 4 | -3 | -2 | -1 | 0 | 1 | 2 | 3 | 4 | -3 | -2 | -1 |

FIG. 14

| COORDINATES | X | 7 | 7 | 7 | 6 | 5 | 5 | 4 | 3 | 3 | 2 | 1 | 1 | 2 | 3 | 3 | 4 | 5 | 5 | 6 | 7 | 7 | 8 | 9 | 10 | 10 | 10 | 10 | 10 |
|---|---|---|---|---|---|---|---|---|---|---|---|---|---|---|---|---|---|---|---|---|---|---|---|---|---|---|---|---|---|
|  | Y | 0 | 1 | 2 | 3 | 4 | 5 | 6 | 7 | 8 | 9 | 10 | 11 | 12 | 13 | 12 | 11 | 10 | 9 | 8 | 7 | 6 | 7 | 8 | 9 | 10 | 8 | 9 | 10 |
| SLOPE CODE |  | 2 | 2 | 3 | 3 | 2 | 3 | 3 | 3 | 2 | 3 | 2 | 3 | 3 | 2 | 2 | 3 | 2 | 3 | 3 | 2 | 7 | 7 | 7 | 7 | 6 | 7 | 6 | 2 | 2 | 2 | 2 |
| CURVATURE CODE |  |  | 0 | 1 | 0 | -1 | 1 | 0 | 0 | -1 | 1 | -1 | 1 | 0 | -1 | 0 | 1 | -1 | 1 | 0 | -1 | 0 | -2 | 0 | 0 | -1 | 0 | 2 | 1 | 2 | 2 | 0 | 0 |

FIG. 16

| CURVATURE CODE | 0 | 1 | 0 | -1 | 1 | -1 | 0 | -1 | 1 | -1 | 0 | -1 | 1 | -1 | 0 | -2 | 1 | 0 | 0 | 2 | 1 | 0 | 0 | 0 |
|---|---|---|---|---|---|---|---|---|---|---|---|---|---|---|---|---|---|---|---|---|---|---|---|---|
| OUTPUT OF CONCAVE ELIMINATING CIRCUIT | 0 | 0 | 0 | -1 | 0 | 0 | 0 | -1 | 0 | 0 | 0 | -1 | 0 | 0 | 0 | -2 | 0 | 0 | 0 | 0 | 0 | 0 | 0 | 0 |

FIG. 13

| INPUT | SLOPE CODE VARIATION | SLOPE VARIATION | OUTPUT |
|---|---|---|---|
| -2 | 0-2 | | -2 |
| | 1-3 | | |
| | 2-4 | | |
| | 3-5 | | |
| | 4-6 | | |
| | 5-7 | | |
| -1 | 0-1 | | -1 |
| | 1-2 | | |
| | 2-3 | | |
| | 3-4 | | |
| | 4-5 | | |
| | 5-6 | | |
| | 6-7 | | |
| 0 | 0-0 | | 0 |
| | 1-1 | | |
| | 2-2 | | |
| | 3-3 | | |
| | 4-4 | | |
| | 5-5 | | |
| | 6-6 | | |
| | 7-7 | | |
| 1 | 1-0 | | 1 |
| | 2-1 | | |
| | 3-2 | | |
| | 4-3 | | |
| | 5-4 | | |
| | 6-5 | | |
| | 7-6 | | |
| 2 | 2-0 | | 2 |
| | 3-1 | | |
| | 4-2 | | |
| | 5-3 | | |
| | 6-4 | | |
| | 7-5 | | |

IDENTIFICATION APPARATUS

BACKGROUND OF THE INVENTION

The invention relates to an identification apparatus and, more particularly, to an identification apparatus to detect a palm pattern contour and identify an individual palm.

Various kinds of identification apparatuses to make a personal identification by detecting a palm pattern contour have been developed. One type of the personal identifications is the one to measure the length of a finger. In this identification apparatus, the base between the second and third fingers comes in contact with a pole vertically planted in a detecting surface and four fingers except the thumb are placed on four narrow windows provided on the detecting surface. Under this condition, the lengths and so on of the fingers are optically measured and the measured finger lengths and so on are compared with the finger length information recorded in a personal card. Through the comparison, the personal identification is made.

In this identification apparatus, only a combination of the lengths and so on of fingers is used for making the personal identification, so that the information for personal identification is insufficient. For this reason, when some measuring errors are taken into consideration, the personal identifications for many persons can not be expected. Further, accurate measurement of the finger length is essential so that individual persons must carefully place his palm on a given location. The accurate positioning of the palm by a person identified takes a relatively long time and is somewhat troublesome work. There is as another an identification apparatus detecting finger prints to make an identification. In this identification apparatus, stain or cut on the finger adversely affects the identifying performance. In general, the finger prints are taken for criminal investigation. This makes an unfavorable impression on the person identified.

SUMMARY OF THE INVENTION

Accordingly, an object of the invention is to provide an identification apparatus for making correct identifications of a number of persons without making unfavorable impressions on the identified persons.

In an identification apparatus according to the invention, the personal identification is made by detecting a character of a palm pattern contour.

DESCRIPTION OF THE PREFERRED EMBODIMENTS

The palm configurations of persons vary with individual persons as much as the finger prints vary. Accordingly, it is possible identify many persons by detecting palm configurations. The palm configuration varies depending on a degree of opening of a palm. Therefore, in the palm configuration detection, the information relating to the palm opening degree must be removed. In the present invention, such information is not taken into consideration and used are the information concerning the features of five fingers.

Figure 1:
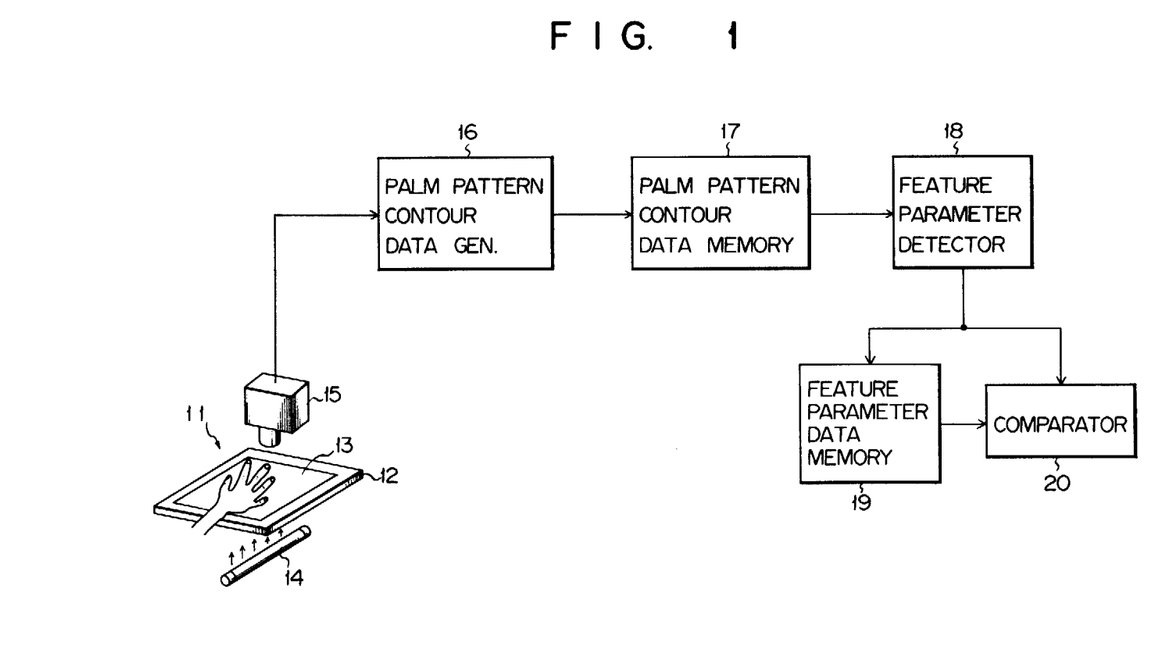
FIG. 1 shows a block diagram of an identification apparatus which is an embodiment according to the invention.

General Description of an Identification Apparatus (FIG. 1)

An overall identification apparatus, which is an embodiment according to the invention, will first be described referring to FIG. 1. In the figure, a palm pattern detector 11 is comprised of a frame 12, a transparent plate 13 firmly supported by the frame 12, on which a palm of a person is placed, a light source 14 disposed under the transparent plate 13, and an ITV camera 15 disposed above the transparent plate 13. A palm pattern contour data generator 16, which is coupled at the input with the ITV camera 15, produces data of a contour of a palm pattern which is obtained by the ITV camera 15. The palm pattern data produced by the palm pattern contour data generator 16 is loaded into a palm contour data memory 17. The data read out from the palm pattern contour data memory 17 is applied to a feature parameter detector 18 where only the data corresponding to the palm pattern feature is detected. The output of the feature parameter detector 18 is supplied to a feature parameter data memory 19 or a comparator 20. Into the memory 19 is loaded the palm feature parameter data when a person to be identified is first registered. When the person is later identified, the parameter data is applied to the comparator 20 where it is compared with the corresponding parameter data read out from the memory 19.

Palm Pattern Contour Data Generator (FIGS. 2 to 5)

Figure 2:
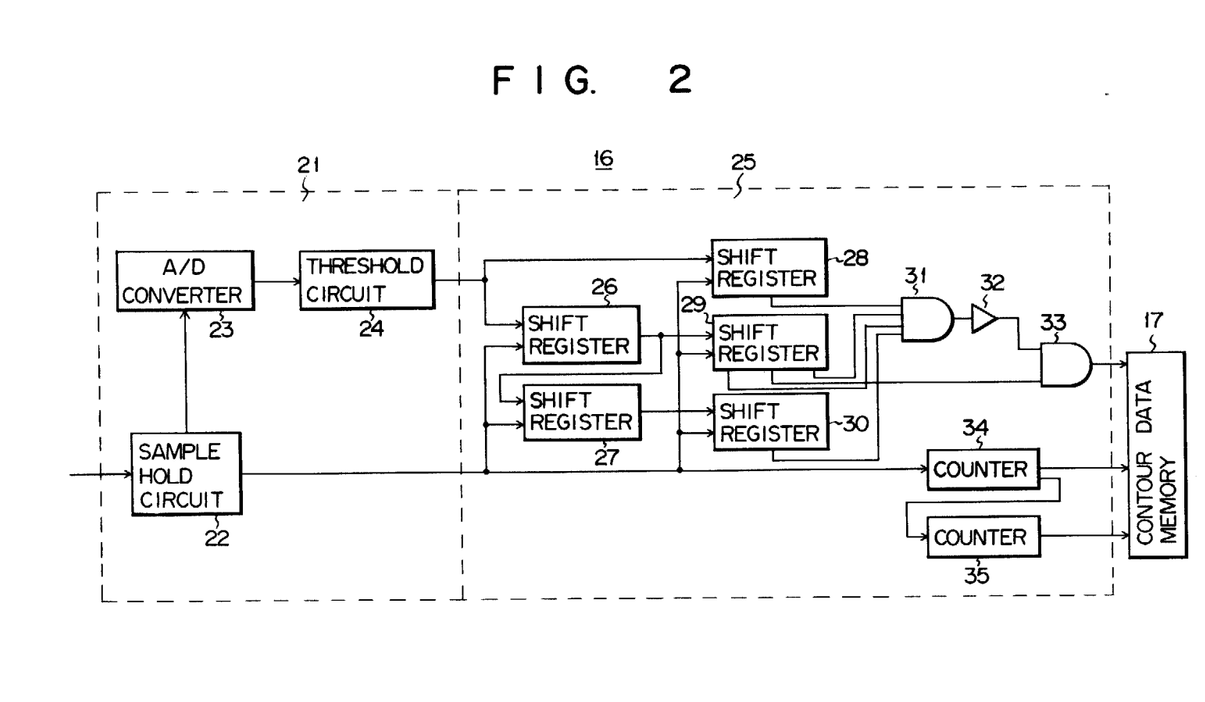
FIG. 2 shows a detailed block diagram of a palm contour data generator shown in FIG. 1.
Figure 3:
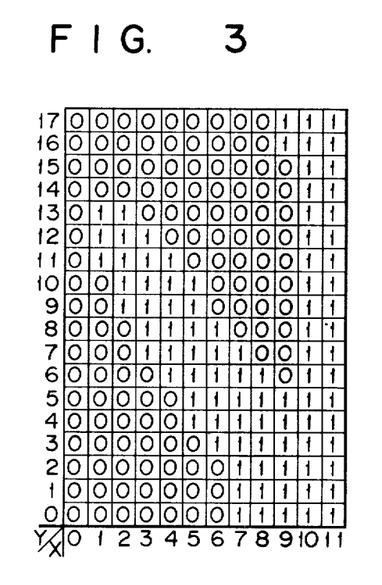
FIG. 3 shows a palm pattern represented by binary data.

The palm pattern contour data generator 16 shown in FIG. 1 will be described in detail with reference to FIG. 2. The output of ITV camera 15 is applied to a sample-hold circuit 22 in a binary coding circuit 21. The output of the sample-hold circuit 22 is coupled to an A-D converter 23, which is also connected at the output to a threshold circuit 24. The binary coding circuit 21 converts a palm pattern analog signal into a corresponding binary signal. For example, the portions corresponding to a palm are represented by binary "1" and the reamining portions by binary "0". FIG. 3 illustrates a binary pattern corresponding to a part of a palm pattern. A palm contour detecting circuit 25 detects data corresponding to the contour of the palm pattern represented by the palm binary bit pattern shown in FIG. 3. The output of the threshold circuit 24 in the binary coding circuit 21 is coupled to shift registers 26 and 28 in the palm contour detecting circuit 25. The output of the shift register 26 is coupled to shift registers 27 and 29. The shift register 27 is coupled with a shift register 30. A synchronizing signal is applied through a sample hold circuit 22 to the shift registers 26 to 30. The shift registers 26 and 27 each store binary bits corresponding to each line of the binary pattern shown in FIG. 3. The shift registers 28 to 30 each store 3 bits. These 3-bit shift registers 28 to 30 cooperate to form a 3×3 matrix bit pattern. The middle bit position of the shift register 28, both side bit positions of the shift register 29 and the middle bit position of the shift register 30 are connected to an AND gate 31. The output of the AND gate 31 is connected through an inverter 32 to one input of an AND gate 33. The AND gate 33 is connected at the other input to the middle bit position of the shift register 29. The synchronizing signal transferred through the sample hold circuit 22 is applied to a counter 34 which is further connected at the output to the counter 35. The outputs of both the counters 34 and 35 are coupled to a contour data memory 17.

Figure 4:
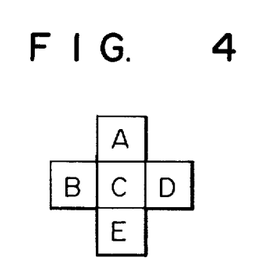
FIG. 4 shows a data pattern used to find a start point coordinate of a palm contour.
Figure 5:
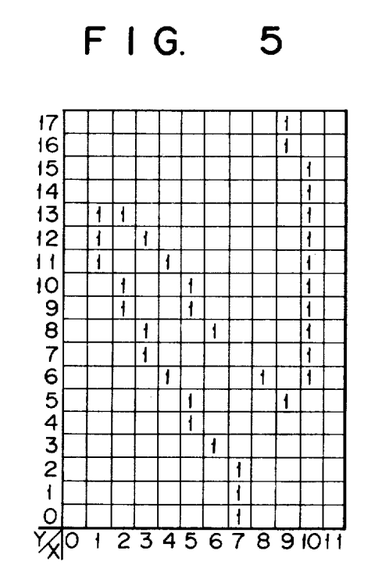
FIG. 5 shows a palm contour pattern stored in a palm contour data memory shown in FIG. 2.

The binary coding circuit 21 forms a binary bit pattern as shown in FIG. 3 and the binary bit pattern formed is transferred each bit line or bit train to the palm contour detecting circuit 25. The shift registers 26 and 27 store bit data of two bit trains corresponding to 0 and 1 on the Y-axis shown in FIG. 3. The bit data of the third bit train, i.e. of 2 on the Y-axis, is supplied to the palm contour detecting circuit 25. A matrix bit pattern of 3×3 defined by 0,1 and 2 on the X-axis and 0, 1 and 2 on the Y-axis, is stored in the shift registers 28 to 30. Under this condition, the bit data at the middle bit position is read out from the shift registers 28 and 30 and the bit data of the side bit position is read out from the shift register 29. The bit data read out is supplied to the AND gate 31. As shown in FIG. 4, four bit data A, B, D and E are supplied to the AND gate 31. These four data are "0" so that the AND gate 31 produces "0". The output of the AND gate 31 is applied through an inverter 32 to one of the inputs of the AND gate 33. To the other input of the AND gate 33 is applied bit data "0" read out from the middle bit position of the shift register 29. In this case, the output of the AND gate 33 is "0". As data are supplied bit by bit from the binary coding circuit 21 to the palm contour detecting circuit 25, the above-mentioned operation is performed while the matrix bits are shifted bit by bit in the X-direction. In this manner, the matrix bit pattern formed by 6, 7 and 8 on the X-axis and 0, 1 and 2 on the Y-axis are stored in the shift registers 28 to 30. Then, bit data "1" read out from the middle bit positions of the shift registers 28 to 30 and bit data "0" and "1" read out from the side bit positions of the shift register 29 are applied to the AND gate 31. Also in this case, the output of the AND gate 31 accordingly is "0" so that to the input of the AND gate 33 is the output "1" of the inverter 32 and the bit data "1" from the middle bit position of the shift register 29. The AND gate 23, upon receipt of these, produces "1". The data "1" indicates one point of the contour of the palm pattern and X and Y coordinates corresponding to the data "1" are counted by the X- and Y counters 34 and 35, respectively. The AND gate 33 produces the results of the logical operation C·(A·B·D·E) of the data pattern shown in FIG. 4. In the logical operation, when the AND gate 33 produces binary "1", the bit position corresponding to C indicates a point on the contour and the coordinates at the bit position are calculated by the counters 34 and 35. The palm contour data thus obtained is stored in the palm contour data memory 17 comprising a random access memory (RAM), for example. The pattern of the palm contour data is shown in FIG. 5 in which the data "0" are all omitted for simplicity.

Figure 6:
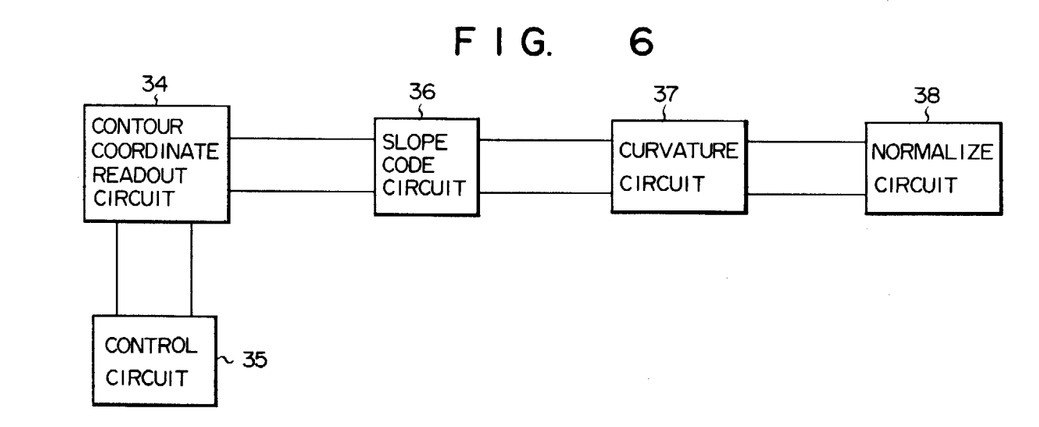
FIG. 6 shows a block diagram of a feature parameter detector shown in FIG. 1.

Feature Parameter Detector (FIG. 6)

The feature parameter detector 18 shown in FIG. 1, which detects a feature parameter of a palm from the palm contour data stored in the palm contour data memory 17, will be described in detail with reference to FIG. 6. The memory 17 is coupled to a contour coordinate readout circuit 34 for reading out the coordinates of the palm contour. The read-out circuit 34 reads out the coordinates of the contour bits represented by "1" from the contour bit pattern. The coordinates read out are (7,0), (7,1), (7,2), (6,3), (5,4), (5,5) . . . (10,15), (9,16), (9,17). The read-out circuit 35 operates in response to the synchronizing signal delivered from the memory 17 when all the contour data have been stored in the contour data memory 17. The completion of the storing operation may be detected through the outputs from the counters 34 and 35 when the counters 34 and 35 both count the final coordinates, that is, (n,m) coordinates. The control circuit 35 also makes an error indication. For example, when the palm is placed on the transparent plate 13 of the palm pattern detector 11 in an incorrect direction, the control circuit 35 indicates that the palm is incorrectly placed. This will be described later in detail.

The contour coordinate read-out circuit 34 is coupled to a slope code circuit 36. In the slope code circuit 36, it is detected how the contour coordinate changes with respect to the preceeding contour coordinates in the X- and Y-directions. In other words, in what direction a point on the contour line inclines with respect to the preceeding point is detected and the inclination is coded as a slope code. The slope code circuit 36 is coupled to a curvature code circuit 37. The circuit 37 calculates of the curvature on the slope code from the slope code circuit 36 and codes it, as described later. The curvature code circuit 37 is coupled to a normalize circuit 38. In the normalize circuit 38, the curvature code of the concave portion of the palm, for example, the finger diversing portion between the adjacent fingers, is made to be "0", while the curvature code corresponding to the convex portion, for example, the finger tip, is retained as an information. The output of the normalize circuit 38 corresponds to the portion which exhibits a feature of an individual, such as the finger tip and is used as a parameter representing a feature of an individual.

Figure 7:
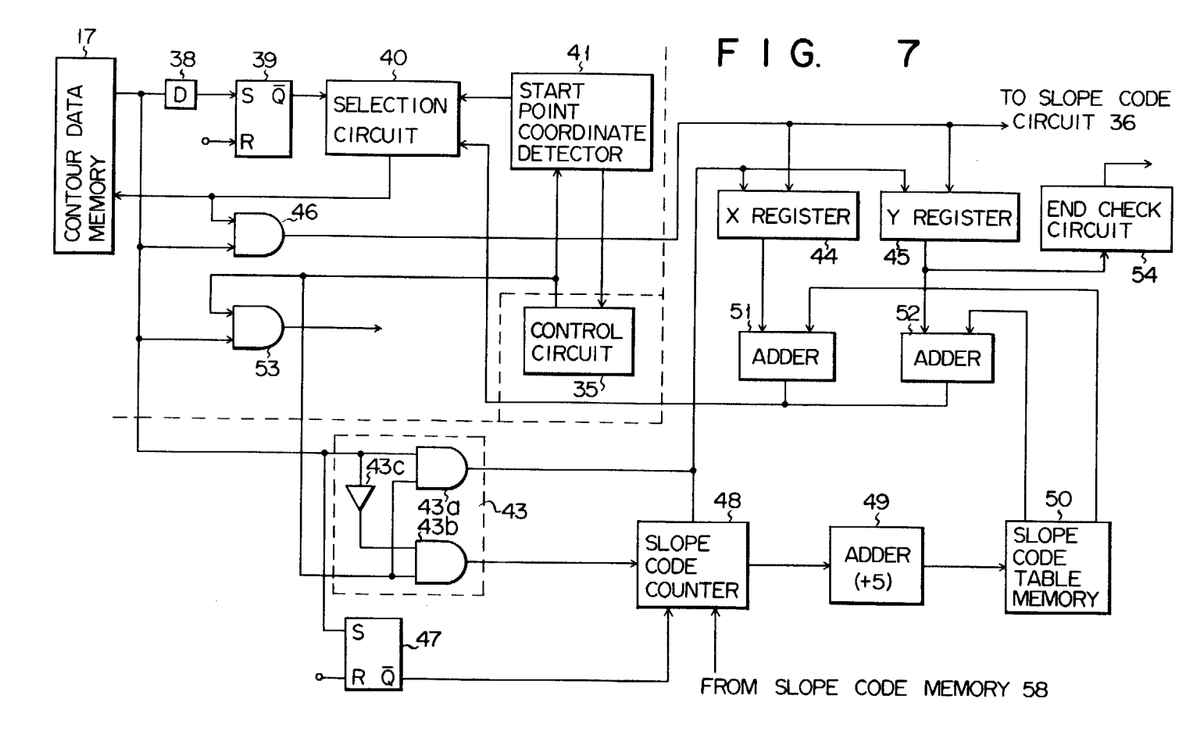
FIG. 7 shows a block diagram of a contour coordinate readout circuit shown in FIG. 6.
Figure 8:
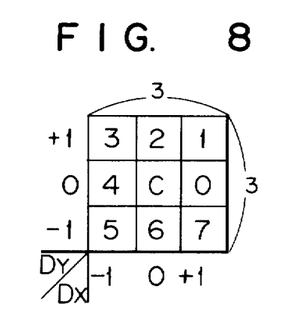
FIG. 8 shows a diagram for illustrating the coding of a slope in a palm contour pattern.
Figure 9:
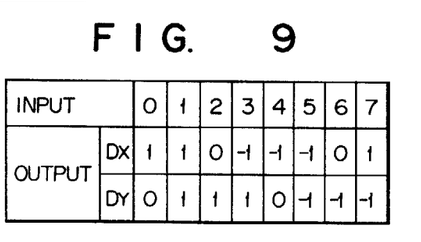
FIG. 9 shows a slope code table stored in a slope code table memory shown in FIG. 7.

Contour Coordinate Read-out Circuit (FIGS. 7 to 9)

The contour coordinate read-out circuit 34 shown in FIG. 6 will be described in detail with reference to FIG. 7. As shown, data read out from the contour data memory 17 is supplied through a delay circuit 38 to the set terminal of a flip-flop 39 which is connected at the output terminal is connected to a selection circuit 40, the output terminal being designated by Q. To the selection circuit 40 is connected the output terminal of a start point coordinate detecting circuit 41. The start point coordinate detecting circuit 41 is used to detect first coordinates, i.e. the coordinates (7,0) in the bit pattern shown in FIG. 5, when the palm contour coordinates is read out. The detecting operation of the start point is carried out in response to a synchronizing signal transferred through a control circuit 35 from the memory 17 when the contour data memory 17 has stored all the contour data. The start point detecting circuit reads out the bit data from 0 to m on the X-axis for 0 on the Y-axis from the memory 17 and detects the bit data of the palm closes to the arm, i.e. the bit data "1" of the coordinates (0,7). The circuit 41 may be constructed by a counter for counting a synchronizing signal and a binary "1" detector which stops the counting operation of the counter in response to the binary "1". The count contents of the counter represents the start point coordinate. At this time, if the start point coordinate data "1" does not lie on the X-axis for Y=0, it is regarded that the insertion direction of the palm is erroneous. This erronous disposition of the palm is indicated by the control circuit 35.

The bit data is successively read out from the contour data memory 17 and the bit data "1" of the coordinates (0,7) of the start point is supplied to the delay circuit 38. At this time, the data "1" fed through the delay circuit is applied to the set terminal of the flip-flop 39 thereby to set the flip-flop 39. As a result, the output of the flip-flop 39 is delivered from the output terminal Q to the selection circuit 40. The selection circuit 40 passes through data from the start point coordinate detecting circuit 41, i.e. the start point coordinate data until the flip-flop 39 is set, while it passes through data from a tracing control circuit 42 after the flip-flop 39 was set. Accordingly, when the flip-flop 39 is set, the bit data "1" of the contour bit pattern is detected in tracing manner from the start point coordinates (0,7). The tracing is carried out by the tracing control circuit 42.

Explanation will be given about the principle of the contour bit pattern tracing by using the tracing control circuit 42. As mentioned above, the start point bit data is located at the coordinates (7,0) in the bit pattern in FIG. 5. In order to detect the bit data at the coordinates (7,1) from the bit data, the data bit at the coordinates (8,0) disposed on the right side of the data bit at (7,0) is checked whether it is "0" or "1" after the data at the coordinates (6,−1), (7,−1), (8,−1) were processed as the binary "0". When the data bit at the coordinates (8,0) is "0", the bit data of the coordinates (8,1) above the bit data at the coordinates (8,0) is checked similarly. As shown, the data bit at the coordinates (8,1) is "0" and therefore the data bit at the coordinates (7,1) is checked. When the bit at the coordinates (7,1) is "1", the coordinates (7,1) is stored and the coordinates (7,1) are used as a base or center coordinates to search the next coordinates (7,2). The bit data at the coordinates around the center coordinates (7,1) are successively checked in the order of the coordinates (8,0), (8,1), (8,2) and (7,2), for example, and the coordinate data (7,2) is detected. In this manner, the bit data "1" in the contour bit pattern shown in FIG. 5 are successively traced and detected.

The tracing control circuit 42 is provided with a contour point detecting circuit 43 supplied with contour data of the contour data memory and a synchronizing signal transferred through a control circuit 35. The contour data 43 is directly applied to one of the input terminals of an AND gate 43a and is applied through an inverter 43c to one of the input terminals of an AND gate 43b. The AND gates 43a and 43b are coupled in receiving relation with the synchronizing signal. When the first contour point data, i.e. the contour point data "1" at the X, Y coordinates (7,0), is applied to the contour point detecting circuit 43, the AND gate 43a produces a signal "1". The binary "1" signal is applied as a latch signal to X and Y registers 44 and 45. As a result, in the X register 44 is latched the X coordinate data (i.e. X=7) of the start point coordinate data transferred through the selection circuit 40 and the AND gate 46. In the Y register 45 is latched the Y coordinate data (i.e. Y=0). The contour point data "1" is applied to the set terminal of the flip-flop 47 thereby to set the flip-flop 47. The reset output terminal Q of the flip-flop 47 is connected to the slope code counter 48. The flip-flop 47 is cleared by the reset output signal of the flip-flop 47 and its clearing state is released when the flip-flop 47 is set. In other words, when the flip-flop 47 is set, the slope code counter 48 is placed in a condition that it can count from "0". The contents of the slope code counter 48 is supplied to an adder 49 where "5" is added to the contents of the counter 48.

The reason why "5" is added to the contents of the counter 48 will be given below. FIG. 8 shows coordinate points of 9(3×3). The center coordinate point represents a start or updated coordinate point. Eight coordinate points around the center coordinate point are coded with slope codes 0, 1, 2, 3, 4, 5, 6, 7 as viewed counterclockwise. When the slope code is "0", data at the coordinates Dx=1 and Dy=0 (the coordinate point on the right side of the center coordinate point) is read out from the contour data memory 17, in order to search the next contour point. If the data at the coordinates Dx=1 and Dy=0 (slope code "0") is "0", the data at the next coordinates is read out. In this case, the coordinate point disposed counterlockwise from the coordinates of the slope code "0" is checked. In the counterclockwise check, the coordinates checked at the preceeding stage must be checked finally. In the contour bit pattern in FIG. 5, when the coordinates X=7 and Y=0 are detected, data at the coordinates X=6 and Y=0 are checked. Accordingly, in FIG. 8, the coordinate point at the left lower side of the center coordinates, i.e. the coordinate point of the slope code 5, is used as the start coordinate point. The check is carried out counterclockwise from the start point. It is for this reason that the adder 49 is used. The output data of the adder 49 is transferred to a slope code table memory 50. The memory 50 stores a Dx, Dy data table shown in FIG. 9 and is comprised of a read only memory (ROM), for example. In the data table in FIG. 9, the input indicates the slope code shown in FIG. 8.

As described above, when the start point data, i.e. the data at the coordinates (7,0), is read out, the data representing the X and Y coordinates i.e. 7 (X coordinate) and 0 (Y coordinate), are loaded into the X and Y registers 44 and 45, respectively. At this time, when the contents of the slope code counter 48 is "0", the output data of the adder 49 is "5". Accordingly, from the slope code table memory 50 are read out Dx and Dy for the input "5", Dx=−1 and Dy=−1, as seen from FIG. 9. The data −1(Dx) and −1(Dy) are transferred to adders 51 and 52, respectively. Further, to these adders 51 and 52 are transferred data "7" and "0" stored in the X and Y registers 44 and 45, respectively, so that, in the adders 51 and 52, calculations 7+(−1) and 0+(−1) are carried out, respectively. The adders 51 and 52 produce "6" and "−1", respectively. In other words, the output data of the adders 51 and 52 are the coordinates X=6 and Y=−1, which are to be searched next. The data corresponding to the X, Y coordinates (6,−1) is transferred through the selection 40 to the memory 17.

The coordinates (6,−1) are outside the effective pattern in the bit pattern in FIG. 5. In this case, the data corresponding to the coordinates (6,−1) is not stored in the contour data memory 17 so that the memory 17 produces "0". The data "0" is supplied to a contour point detecting circuit 43. As a result, the output of the AND gate 51b is supplied to the slope code counter 48 which is in turn counted up to have count "1". The count "1" of the counter 48 is added to "5" in adder 49. The output data "6" of the adder 49 is supplied to the slope code table memory 50. From the slope code table memory 50 are read out Dx=0 and Dy=−1 corresponding to the input "6" in FIG. 9 and the read out ones are transferred to the adders 51 and 52, respectively. The adders 51 and 52 perform calculations "7+0" and "0+(−1)", respectively, and produce 7 and −1. In this manner, X and Y coordinates (7,−1) are obtained. The coordinates (7,−1) exists outside the bit pattern in FIG. 5 so that data "0" is delivered from the memory 17. In response to the data "0", the slope code counter 48 is further counted up to have count "2". As a result, the adder 49 produces "7" and Dx=1 and Dy=−1 are read out from the slope code table memory 50 and the read out ones are transferred to the adders 51 and 52, respectively. The adders 51 and 52 in turn produces "8" and "−1", respectively. The coordinates (8,−1) also outside the bit pattern now being considered. As a result, the slope code counter 48 is counted up to "3". When the "5" in the adder 49 is added to the "3", the result of addition is "8". However, the adder 49 is so constructed that, when the result of the addition is "8" or more, "8" is subtracted from the additional result. Accordingly, in this case, the adder 49 produces "0". As shown in FIG. 9, when the input is "0", Dx and Dy are "1" and "0", respectively. When the data Dx=1 and Dy=0 are supplied to the adders 51 and 52, the coordinate data corresponding to the coordinates (8,0) is supplied to the memory 17 through the selection circuit 40. The coordinates (8,0) are within the bit pattern area under consideration in FIG. 5; however, the corresponding data is "0" so that data "0" is read out from the memory 17. Therefore, the slope code counter 48 is counted up to "4". In this manner, the counter 48 is counted up to "5", so that the output of the adder 49 becomes "2" and the memory 50 produces Dx=0 and Dy=1. In this case, the adders 51 and 52 produce "7" and "1", respectively, Accordingly, the data at the coordinates (7,1) is read out from the contour data memory 17. Since the data is "1", the AND gate 43a of the contour point detecting circuit 43 produces an output signal. In response to the output signal from the AND gate 43a, the X and Y coordinate data "7" and "1" are latched in the X and Y registers 44 and 45, respectively.

Figure 10:
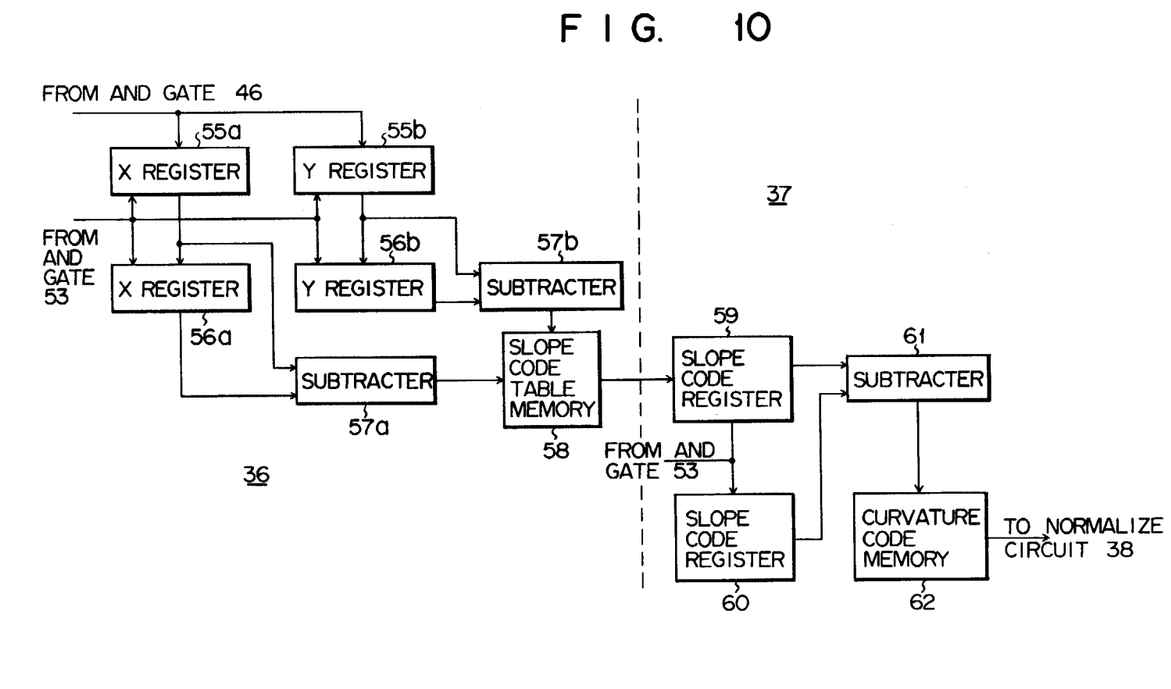
FIG. 10 shows a block diagram including a slope code circuit and a curvature circuit shown in FIG. 6.

Slope Code circuit (FIG. 10)

Figure 11:
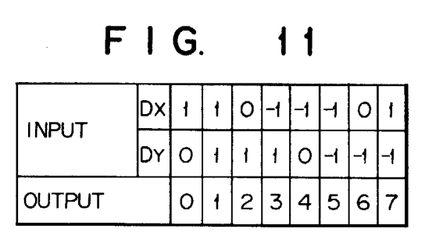
FIG. 11 shows a slope code table stored in a slope code table memory shown in FIG. 10.

For easy of explanation, the slope code circuit 36 shown in FIG. 6 will be described with reference to FIG. 10 illustrating the slope code circuit 36 and the curvature circuit 37. In the circuit 36, the X register 55a and the Y register 55b latch the start point coordinates, X=7 and Y=0. When the contour point coordinates are detected, data stored in the X and Y registers 55a and 55b are transferred to the X and Y registers 56a and 56b while in the X and Y registers 55a and 55b are latched new coordinate data, X=7 and Y=1. As the latch signal is used the output signal of the AND gate 53. The output data of the X registers 55a and 56a are transferred to a subtracter 57a while the output data of the Y registers 55b and 56b are transferred to the subtracter 57b. In the subtracter 57a, the data in the X register 56a, i.e. the X coordinate data "7" of the start point, is subtracted from the data in the X register 55a, i.e. the new X coordinate data "7". Similarly, in the subtracter 57b, the data "0" in the Y register 56b is subtracted from the data "1" in the Y register 55b. As a result, the subtracters 57a and 57b produce "0" and "1", respectively. The data "0" and "1" are transferred to a slope code table memory 58 comprising ROM, for example. In the memory 58 is stored code data as shown in FIG. 11. Accordingly, when the output data "0" (Dx) of the subtracter 57a and the output data "1" (Dy) of the subtracter 57b are loaded into the memory 58, the output data "2" corresponding to Dx=0 and Dy=1 are read out from the memory 58.

Contour Coordinate Readout Circuit

Reference is made again to FIG. 7 illustrating the contour coordinate readout circuit 34. The output signal of the AND gate 43a is also applied to the slope code counter 48. At this time, the slope code "2" from the memory 58 referred to in FIG. 10 is supplied to the slope code counter 48 which in turn latches the slope code "2" the output signal of the AND gate 43a. Accordingly, the adder 49 calculates 2+5 and produces "7". When the output "7" of the adder 49 is transferred to the slope code table memory 50, the data Dx=1 and Dy=−1 corresponding to the input "7" shown in FIG. 9 are transferred to the adders 51 and 52. At this time, the X and Y registers 44 and 45 have stored data "7" and "1", respectively, so that the adders 51 and 52 calculate 7+1 and 1+(−1) and produce "8" and "0". In this way, the X and Y coordinate data representing the coordinates (8,0) is obtained. The coordinate data is transferred through the selection circuit 40 to the contour data memory 17. From the memory 17 is read out the data at the coordinates (8,0). Since the data is "0", the slope code counter 48 is counted up from "2" to "3" in response to the output signal of the AND gate 43b. When the count "3" is added to the "5" of the adder 49, the adder 49 produces "0", as previously state. Upon this, "1" and "0" are transferred from the slope code table memory 50 to the adders 51 and 52. The adders 51 and 52 produces data "8" and "1", respectively. In other words, the data at the X and Y coordinates (8,1) is read out from the contour data memory 17. Then, the data at the coordinates around the coordinates (7,1) are successively read out counterclockwise in a similar manner. In this way, when all the coordinates are successively read out in the order (7,2), (6,3), (5,4) ..., an END check circuit 54 produces an end signal. The END check circuit 54 produces the output signal in response to "0" which is second time latched by the Y register 45. The Y register 45 stores the first "0" at the start point coordinate (7,0) and stores the second "0" at the end point coordinates.

The curvature circuit 37 receives the slope code data from the slope code table memory 58, as shown in FIG. 10. The slope code data is stored in the slope code register 59. The slope code register 59, when the new slope code data is transferred, transfers the slope code data previously stored to the slope code register 60 and stores a new slope code data. The slope code data stored in the both the slope code registers 59 and 60 are applied to the subtracter 61. In the subtracter 61, the preceeding slope code is subtracted from the new slope code. The result of the subtraction is transferred to the curvature code memory 62. The curvature code memory 62 has stored the curvature code shown in FIG. 12.

The code shown in FIG. 12 will be described with reference to changes of slope shown in FIG. 13. In FIG. 13, illustrated inputs are −2, −1, 0, 1, 2. In the case of 2 of the input, the following six states may be considered for slope code change: (1) 2 to 0, (2) 3 to 1, (3) 4 to 2, (4) 5 to 3, (5) 6 to 3, (6) 7 to 5, as shown in FIG. 13. In the slope change state (1), a new clope code "0" is loaded into the slope code register 59 in FIG. 10 and the preceding code "2" is loaded into the slope code register 60. Therefore, the subtracter 61 calculates 0−2 and produces −2. As seen from FIG. 8, the slope code "2" implies that the succeeding contour point exists right above the contour point previously detected. The slope code 0 implies that the succeeding contour point lies on the right side of the previously detected contour point. Accordingly, the first slope change state (1) changing from 2 to 0 indicates that a contour point moves from the contour point right above the preceding one to that on the right side thereof. This slope change state is illustrated in the block of the slope change corresponding to the slope change state 0−2 in the input −2 in FIG. 13. This is correspondingly applied to the remaining change states (2) to (6). For example, when the input is −2, there are six slope change states which are visually indicated by arrows in FIG. 13. As indicated by arrows, the contour point in each slope change state changes its direction at 90°.

When the input is −1, there are seven slope change states as shown in FIG. 13. The contour point in each slope change state changes its direction at 135°. When the input is "0", the slope change states are eight and the contour point is moved keeping its direction. When the input is "1", the slope change states are seven and the contour point is moved changing its direction at angle 135°. When the input is "2", the slope change states are six and the contour point changes its direction at 90°. As just mentioned, the slope change takes a concave shape as in the inputs −2 and −1, a flat shape as in the input 0 and a convex shape as in the inputs 1 and 2. In the slope change code of the example, minus sign (−) is assigned to the concave shape, and a plus sign (+) to the convex shape. As the angle in the direction change is smaller, a larger number is used for the coding. In FIGS. 12 and 13, the curvature codes are shown as outputs. In the case of ±3 and ±4 of the outputs shown in FIG. 12, similar slope changes are expected. In the case of +3, the slope change takes a convex shape with the direction change of 45°. In the case of −3, slope change takes a concave shape with 45°. When the output is +4, the direction of the slope change is inverted. As seen from FIG. 12, the outputs are equal for the inputs −7 and 1, −6 and 2, −5 and 3, −4 and 4, −2 and 6, and −1 and 7. This is easily seen from the slope change shown in FIG. 13.

Figure 14:
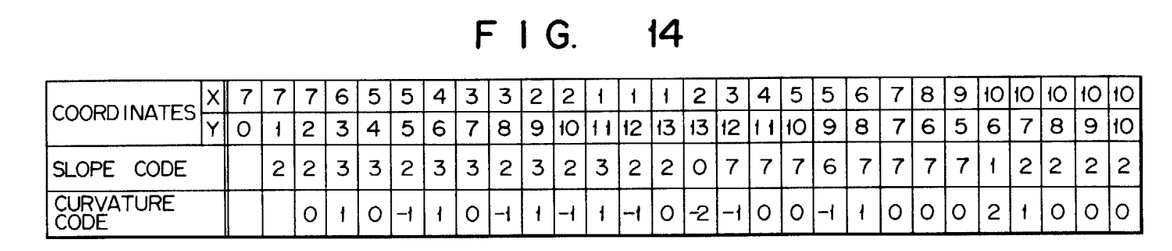
FIG. 14 shows a table for illustrating a relation among a contour point coordinate, a slope code and a curvature code.

FIG. 14 shows a table in which the slope code and the curvature code are tabulated with respect to the bit pattern in FIG. 5. In FIG. 14, the slope code is the output data of the slope code memory 58 and the curvature code is the output data of the curvature code memory 62. As seen from FIGS. 14 and 5, the convex shaped portion, i.e. the portion where the curvature code in FIG. 14 is minus, represents the finger tip or the joint region. Further, the convex shape at the finger tip is configured at a large angle while the convex shape at the joint region is configured at a small angle. The concave portion with a large angle, that is to say, the curvature code in FIG. 14 is plus, and the portion with large number indicates the finger diversing portion.

In the present invention, only the convex portions are taken out from the contour line of the palm and a combination of the convex portions are used to indicate a feature of an individual. The data of the convex portions are taken out by the normalize circuit 38.

Figures 15, 17:
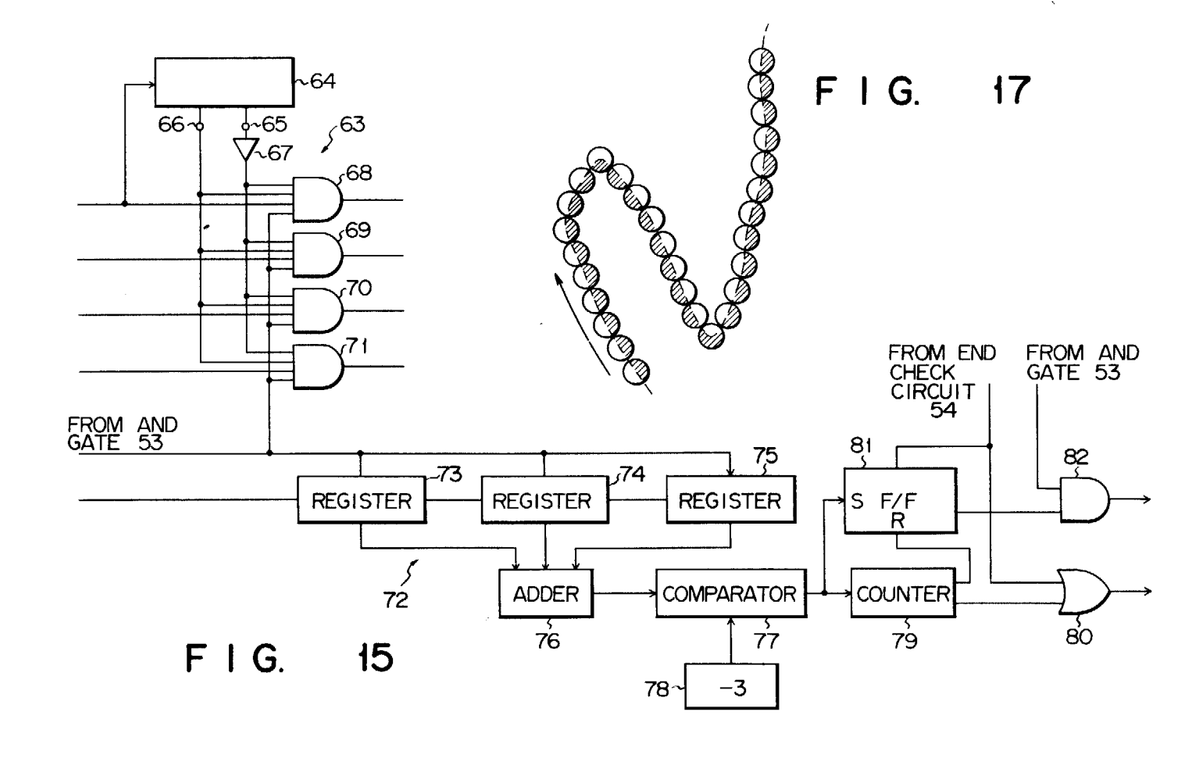
FIG. 15 shows a block diagram of a normalize circuit shown in FIG. 1.
FIG. 17 shows a diagram for illustrating a method to detect a palm contour by a palm contour detector used in an identification apparatus which is another embodiment according to the invention.

Normalize Circuit (FIG. 15)

Figure 16:
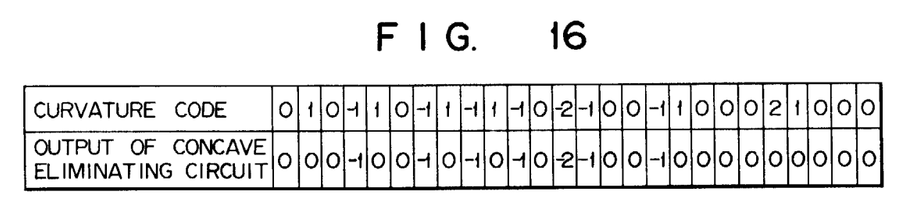
FIG. 16 shows a relation between a curvature code and output data from a concave portion removal circuit shown in FIG. 15.

The normalize circuit 38 shown in FIG. 6 will be elaborated with reference to FIG. 15. The curvature code read out from the curvature code memory 62 is transferred to a concave part elimination circuit 63. In the circuit 63, the sign of the code is checked. The sign check circuit 64 produces an output signal at the terminal 65, when the code sign is plus or zero. It produces an output signal at the terminal 66 when the code sign is minus. The output signal delivered through the terminal 65 is applied to AND gates 68 to 71, through an inverter 67. The signal delivered through the terminal 66 is directly applied to the AND gates 68 to 71. As a result, the curvature codes with minus sign is outputted through the AND gates 68 to 71. The remaining codes are produced as "0". The code shown in FIG. 14 is coded into a code as shown in FIG. 16. The output code from the convex part eliminating circuit 63 is used as a parameter representing a feature of an individual.

The data read out from the curvature code memory 62, i.e. curvature code, is transferred to the finger tip judging circuit 72, too. In the circuit 72, three curvature codes are loaded into three registers 73, 74 and 75 in synchronism with a synchronizing signal. The memory contents of these registers 73 to 75 are supplied to an adder 76 where it is subjected to an addition. The result of the addition from the adder 76 is transferred to a comparator 77 where it is compared with a reference value, i.g. −3, from a reference value memory 78. The comparator 77 produces an output when the result of the addition is a minus value and its absolute value is 3 or more. That is, in response to the curvature code (e.g. −3 or more) corresponding to the convex shape with a large angle (indicating a finger tip), the comparator 77 produces an output signal indicating the detection of the finger tip. The number of the fingers is counted by counting the output signal of the comparator 77 by the counter 79. When the counter 79 counts five fingers, it produces an output signal which in turn is outputted through an OR gate 80 and is used as an end signal. The output signal from the comparator 77 corresponding to the first finger tip sets the flip-flop 81 and the output signal of the counter 79, i.e. the output signal produced when the counter 79 counts five fingers resets the flip-flop 81. The output signal of the flip-flop 81, together with a synchronizing signal, is applied to an AND gate 82. In response to the output of the AND gate 82, the output data of the concave eliminating circuit 63, i.e. the feature parameter data, is stored in the feature parameter data memory 19. Only in the registering, the feature parameter data is stored in the feature parameter data memory 19. In the identifying operation, the feature parameter data is supplied to the comparator 20. The comparator 20 compares the feature parameter data already registered from the feature parameter data memory 19 with the feature parameter data newly inputted and to be identified. The feature parameter data memory 19 may be constructed by an ordinary nonvolatile memory, for example. The comparator 20 may be constructed by a conventional comparator.

The feature parameter includes the information of not only the shape of the finger tip or the joint region but also the length of the contour line of all the finger tips of the five fingers. The number of the synchronizing signals generated during a period from the time that the finger tip judgement circuit 72 detects the finger tip of the thumb to the time that it detects the finger tip of the index finger, indicates the length of the contour line from the finger tip of the thumb to the finger tip to the index finger. Accordingly, if the comparator 20 identifies an individual to be identified in the identifying operation, it indicates that between the registered feature parameter and newly inputted feature parameter coincide the length of the contour line between the finger tips as well as the shapes of the finger tips and the joint region of the identified person. In other words, the comparator 20 does not identify the individual even if only the shapes of the finger tips are coincident each other, only the shapes of the joint regions are coincident each other or only the lengths of the contour lines between finger tips are coincident each other.

The identification apparatus according to the invention attaines the following many useful effects.

1. The information for identifying an individual include a lot of information such as the shapes of finger tips (various shapes of five fingers), the shapes of the joint regions, the length of the contour line between the finger tips, and the like. These pieces of information well exhibiting a feature of an individual so that the identification is very accurately made.

2. The high accuracy of the identification permits an identification of many persons.

3. The information corresponding to the concave parts in the palm contour is not used for the identifying. Accordingly, the identifying operation is not influenced by the degree of opening between fingers so long as the fingers come in contact with each other when a palm is placed on a placing plate of the palm pattern detector.

4. The curvature of the palm contour after the concave part indicating the part between fingers is eliminated is independent of the location the palm is placed. Accordingly, the palm may be placed at any location on the palm placing plate only if it is aligned with one of the four sides of the palm placing plate.

5. For the above reasons 3 and 4, an individual is free from troublesome feeling when he places his palm on the palm placing plate for the registration or identification.

6. Since no finger print is used for the identification, the individual identification is not influenced by cut or stain of the finger print, so long as the palm contour is not largely changed.

7. No use of the finger print gives no unfavorable impression to an individual to be registered or identified.

In the above example, the ITV camera is used for detecting the palm contour. An optically contour tracing method as shown in FIG. 17, which may be used, can accurately and easily detect the contour and the coordinates. In this method the contour of the palm placed on the palm placing plate is illuminated by a spot light from one side and the spot light is received at the opposite side of the palm. The half of the spot light illuminates the inside of the palm while the other half thereof illuminates the outside of the palm. Under this condition, the spot light is moved. In this method, the locus traced by the spot light directly indicates the contour line of the palm. Accordingly, when the coordinates at the moving spot locations are subsequently detected, the coordinates of the contour line may be successively obtained.

In the example mentioned above, the coordinate points are counterclockwise searched about the coordinate point already found for detecting the succeeding contour point. When the search is made clockwise, the contour coordinate point may be directly detected from the bit pattern in FIG. 3 so that the palm contour detecting circuit shown in FIG. 2 is unnecessary.

In FIGS. 3 and 5, relatively coarse coordinate points are used. More detailed coordinate points provides a more accurate identification. In practical use, the bit pattern is detailed 5 to 10 times as much as that in FIGS. 3 and 5.

Figure 12:
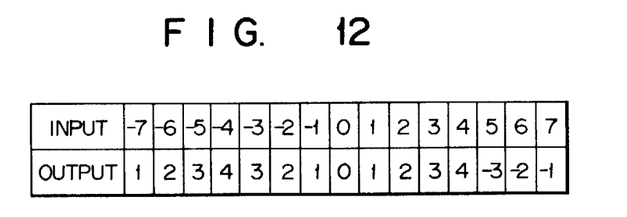
FIG. 12 shows a curvature code table stored in a curvature code memory shown in FIG. 10.
Figure 13:
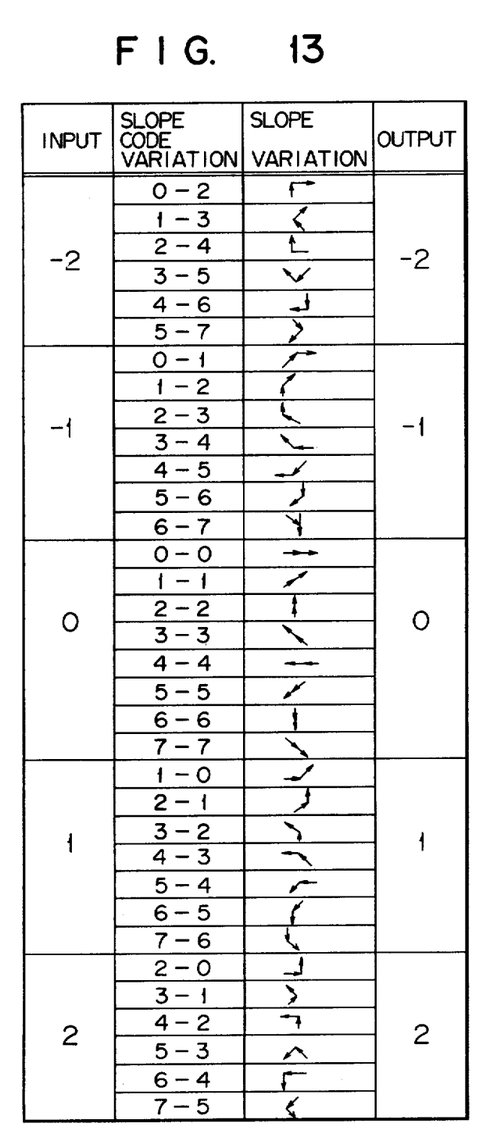
FIG. 13 shows a table useful in explaining the curvature code table shown in FIG. 12.

The slope code and the curvature code illustrated in FIGS. 9, 11 and 12 are simplest examples. More complicated codes improves the accuracy of the identification.

What is claimed is:

1. An identification apparatus comprising:
   a palm pattern detector including a palm placing plate on which a palm is placed and means for generating an analog signal corresponding to the pattern of the palm;
   means for converting the analog signal from said palm pattern detector into digital signals to form a palm pattern comprised of a number of binary bit data;
   means for taking out the bit data corresponding to the palm contour from the bit pattern in said palm bit pattern forming means thereby to form a palm contour bit pattern;
   a contour data memory for storing the contour bit pattern in said palm contour bit pattern;
   slope data coding means including means for successively calculating the coordinate points of the contour bit data of the palm contour bit pattern in said memory along the palm contour, and said slope data coding means calculating the direction and degree of a slope of a segmental part of the contour line component between adjacent coordinate points and coding the slope;
   curvature coding means which receives slope code data from said slope data coding means, calculates the direction and degree of a slope between adjacent line components and produces the change as a curvature code;
   a feature parameter output circuit which receives the curvature code, eliminates the curvature code representing a concave part of the palm pattern, and outputs the data including the information of the convex part; and means for receiving the feature parameter data from said feature parameter output circuit to make a personal identification.

2. An identification apparatus according to claim 1, in which said palm contour bit pattern forming means comprising: means for storing 9 bit data of the palm bit pattern from said palm bit pattern forming means in the form of a 3×3 matrix, a first AND gate for receiving the bit data other than the center bit data in the 3×3 matrix bit data stored in said memory means and four corner bit data, an inverter for inverting the output data of said AND gate, and a second AND gate for receiving the output data of said inverter and the center bit data.

3. An identification apparatus according to claim 1, in which said means for calculating the coordinates of the center bit comprises means for detecting the contour bit data corresponding to a point on a palm contour as a start bit data, and means for tracing said contour bit data from the start point bit data along the palm contour.

4. An identification apparatus according to claim 3, in which said tracing means comprises means for successively checking the bits around the contour point data and producing output data in response to the detection of adjacent contour bit data, means for storing the detected contour bit data in response to the output signal from said contour bit data detecting means, thereby to successively check the bits around the contour point data newly detected by said contour bit data detecting means.

5. An identification apparatus according to claim 4, in which said slope data coding means comprises: a counter which is counted up every time the bits are successively checked, a first slope code table memory which stores information representing a plurality of different slopes and from which the information corresponding to the counter contents of said counter is read out, means which receives the information from said memory and calculates the coordinates of a bit to next be checked, means which responds to the output signal generated from said contour bit data detecting means when said adjacent contour bit data is detected to calculate a displacement between the coordinates of the original contour bit data and the adjacent contour bit data, thereby to produce a coordinate displacement information, and a second slope code table memory which stores the code information representing different slope and from which the corresponding code information is read out by the coordinate displacement information.

6. An identification apparatus according to claim 5, in which said curvature coding means comprises: two slope code registers for storing the slope code information successively read out from said second slope code table memory, respectively, and means for which calculates the slope code information stored in these registers and calculates a curvature between contour line components based on both the slope code information to output a curvature code information.

7. An identification apparatus according to claim 1, in which said feature parameter output circuit comprises an AND gate which receives the curvature information of said curvature coding means to permit the curvature information corresponding to a convex part of the contour to pass therethrough.

8. An identification apparatus according to claim 1, in which said personal identification means comprises a comparator for comparing a feature parameter of said feature parameter output circuit with a feature parameter already registered.

9. An identification apparatus according to claims 1 to 8, in which said palm pattern detector is an ITV camera for generating a video signal corresponding to a palm pattern.

10. An identification apparatus according to claim 1, in which said palm pattern detector is comprised of means for projecting a spot light along the contour of a palm so as to cause the center of the spot light to position on the contour of the palm.

* * * * *